(12) United States Patent
Davies et al.

(10) Patent No.: US 10,183,653 B2
(45) Date of Patent: Jan. 22, 2019

(54) ON-BOARD VEHICLE VISION AND CLEANING SYSTEM

(71) Applicant: KAUTEX TEXTRON GMBH & CO. KG, Bonn (DE)

(72) Inventors: Chris Davies, Hengoed (GB); Steven Shields, Hengoed (GB); Aaron Williams, Hengoed (GB)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 15/526,620

(22) PCT Filed: Oct. 29, 2015

(86) PCT No.: PCT/EP2015/075067
§ 371 (c)(1),
(2) Date: May 12, 2017

(87) PCT Pub. No.: WO2016/074933
PCT Pub. Date: May 19, 2016

(65) Prior Publication Data
US 2017/0313287 A1 Nov. 2, 2017

(30) Foreign Application Priority Data
Nov. 14, 2014 (DE) .......................... 10 2014 116 681

(51) Int. Cl.
*B60S 1/56* (2006.01)
*G02B 27/00* (2006.01)

(52) U.S. Cl.
CPC ............ *B60S 1/56* (2013.01); *G02B 27/0006* (2013.01)

(58) Field of Classification Search
CPC .............................. B60S 1/56; G02B 27/0006
See application file for complete search history.

(56) References Cited

U.S. PATENT DOCUMENTS

| | | |
|---|---|---|
| 3,117,727 A | 1/1964 | Pollock et al. |
| 3,656,691 A | 4/1972 | Norstrand |
| 3,719,819 A | 3/1973 | Lowell |

(Continued)

FOREIGN PATENT DOCUMENTS

| | | |
|---|---|---|
| CN | 101746358 | 6/2010 |
| DE | 19842249 | 3/2000 |

(Continued)

OTHER PUBLICATIONS

PCT International Search Report dated Jan. 12, 2016, received in corresponding PCT Application No. PCT/EP2015/075067.

(Continued)

*Primary Examiner* — Michael E Barr
*Assistant Examiner* — Benjamin L Osterhout
(74) *Attorney, Agent, or Firm* — Grossman, Tucker, Perreault & Pfleger, PLLC

(57) ABSTRACT

The invention refers to an on-board vision and cleaning system comprising a sensor unit mounted in a vehicle body, a cleaning fluid source, a cleaning fluid pump, a nozzle carrier, at least one cleaning fluid nozzle attached to the nozzle carrier, wherein the nozzle carrier is designed as a swivel arm which upon actuation may be flipped from a tilted back position which is a rest position into an elevated position which is an operating position.

14 Claims, 5 Drawing Sheets

(56) References Cited

U.S. PATENT DOCUMENTS

| | | | |
|---|---|---|---|
| 4,752,032 A | 6/1988 | Costa et al. | |
| 5,708,859 A | 1/1998 | Tajima et al. | |
| 6,398,130 B2 | 6/2002 | Pfalzgraf | |
| 6,527,000 B1 | 3/2003 | Randmae et al. | |
| 8,042,749 B2 | 10/2011 | Son et al. | |
| 8,567,963 B1* | 10/2013 | Criscuolo | B08B 1/006 359/507 |
| 2002/0005440 A1* | 1/2002 | Holt | B05B 7/08 239/284.2 |
| 2005/0206511 A1* | 9/2005 | Heenan | B60S 1/0822 340/438 |
| 2008/0072393 A1 | 3/2008 | Tanaka | |
| 2009/0250533 A1* | 10/2009 | Akiyama | B60S 1/381 239/284.1 |
| 2013/0028588 A1 | 1/2013 | Suman et al. | |
| 2013/0048036 A1 | 2/2013 | Jonas | |
| 2013/0209079 A1 | 8/2013 | Alexander et al. | |
| 2015/0344001 A1* | 12/2015 | Lopez Galera | B60S 1/56 134/198 |

FOREIGN PATENT DOCUMENTS

| | | |
|---|---|---|
| DE | 10232227 | 1/2004 |
| DE | 102005021671 | 11/2006 |
| EP | 1616762 | 1/2006 |
| FR | 2930104 | 10/2009 |
| JP | S51-128792 | 10/1976 |
| JP | 2006-198602 | 8/2008 |
| JP | 2013-068735 | 4/2013 |
| JP | 2013-119299 | 6/2013 |
| WO | 2015/003705 | 1/2015 |

OTHER PUBLICATIONS

International Preliminary Report on Patentability dated Jan. 25, 2017, received in corresponding PCT Application No. PCT/EP2015/075067.

* cited by examiner

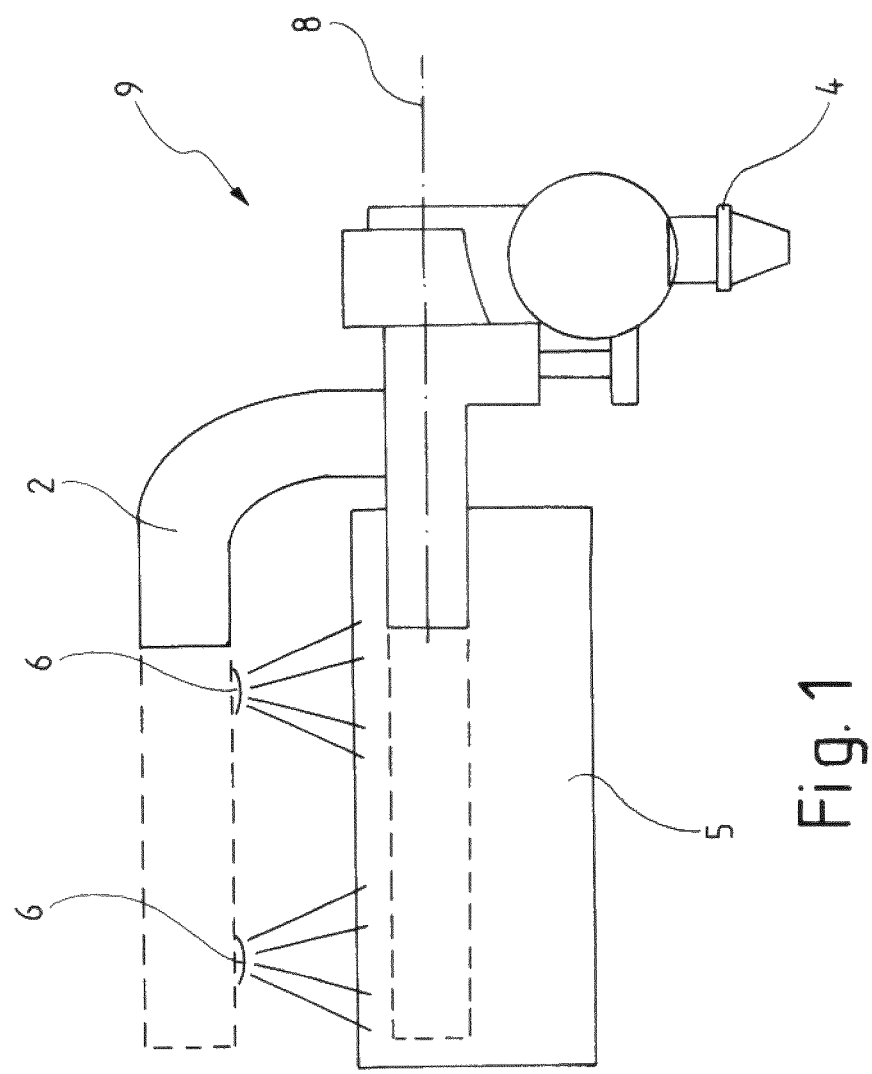

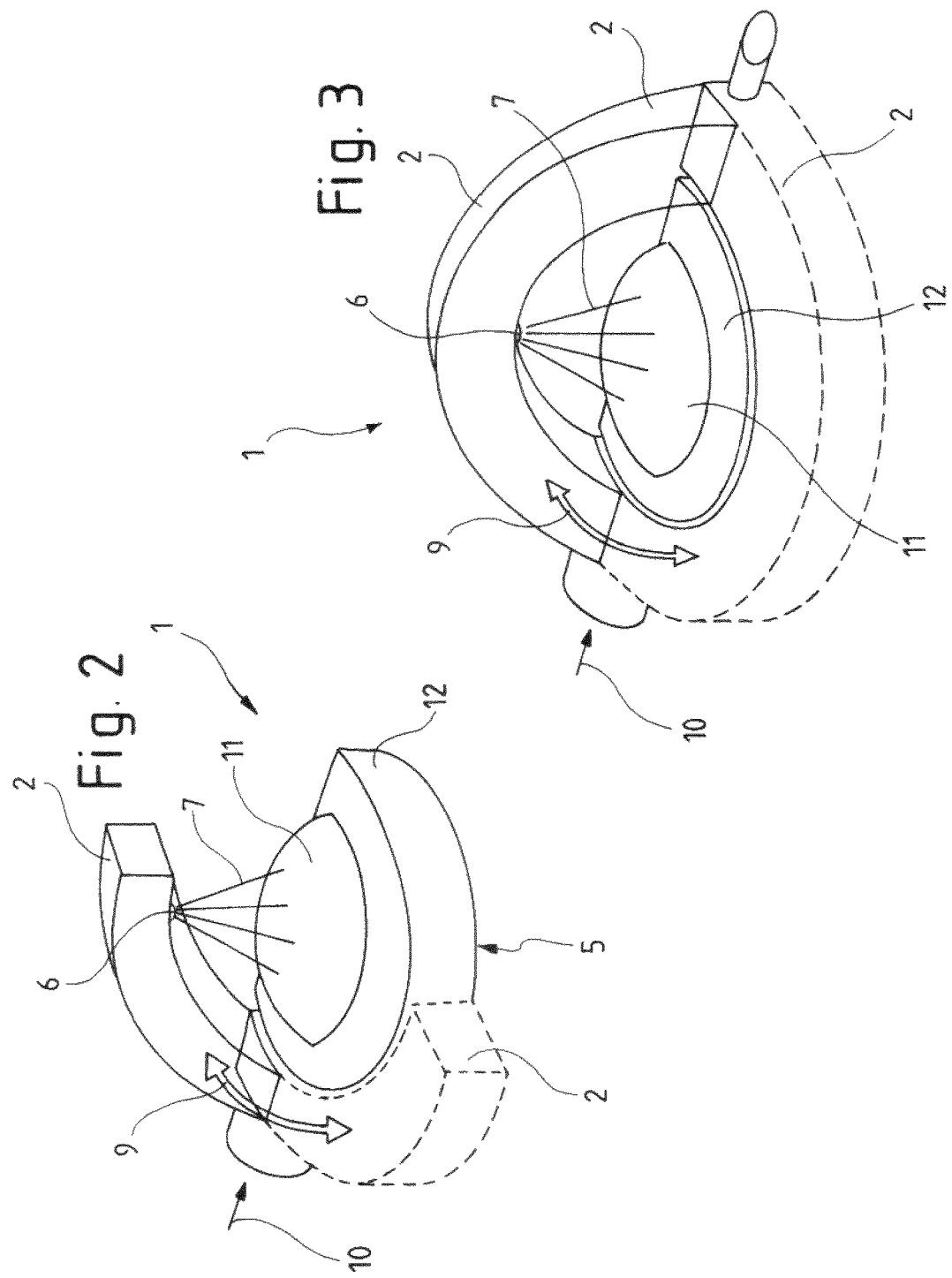

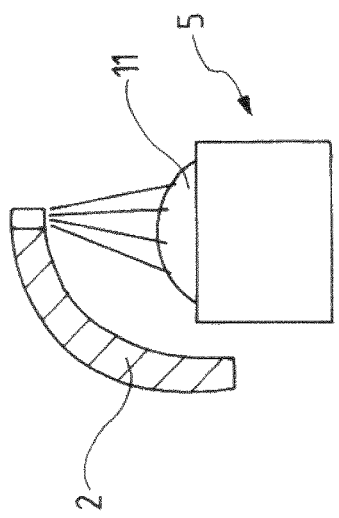
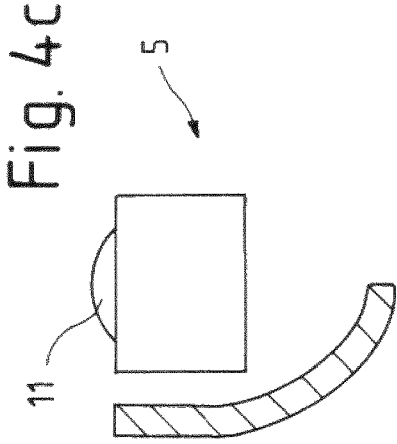
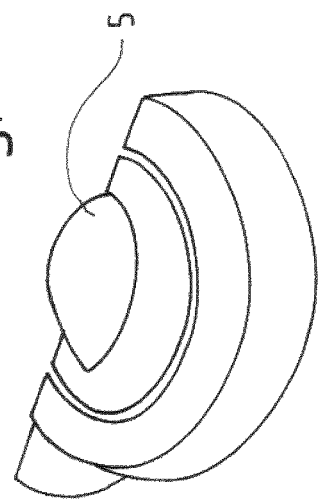
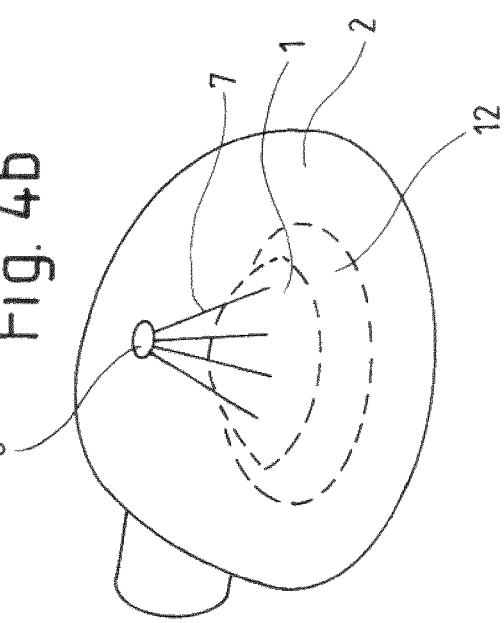

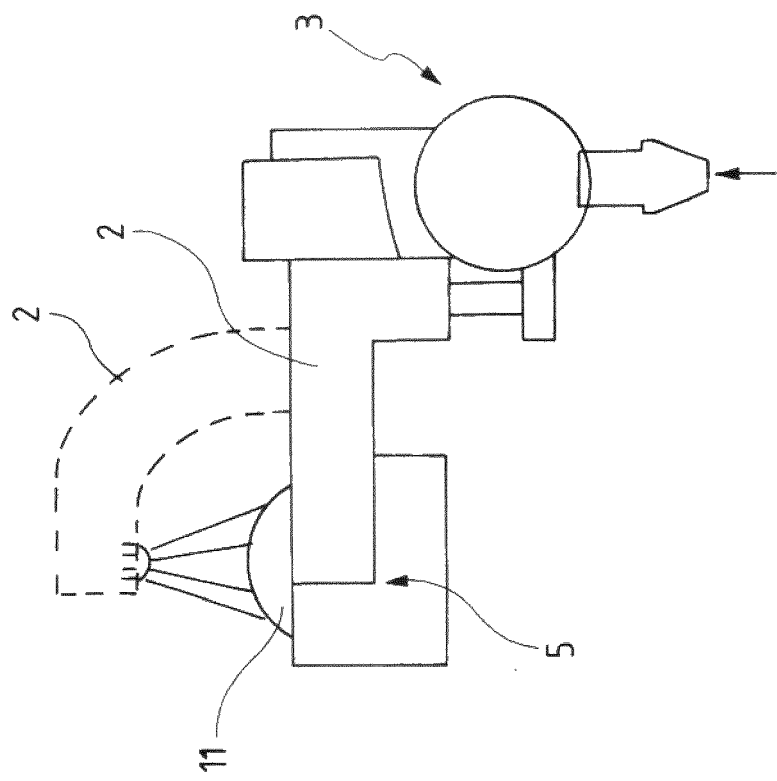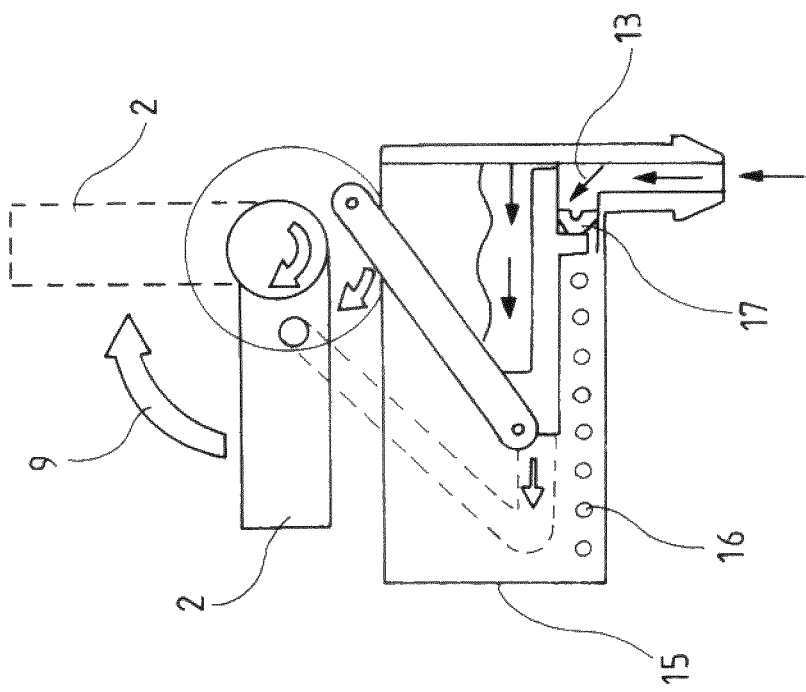

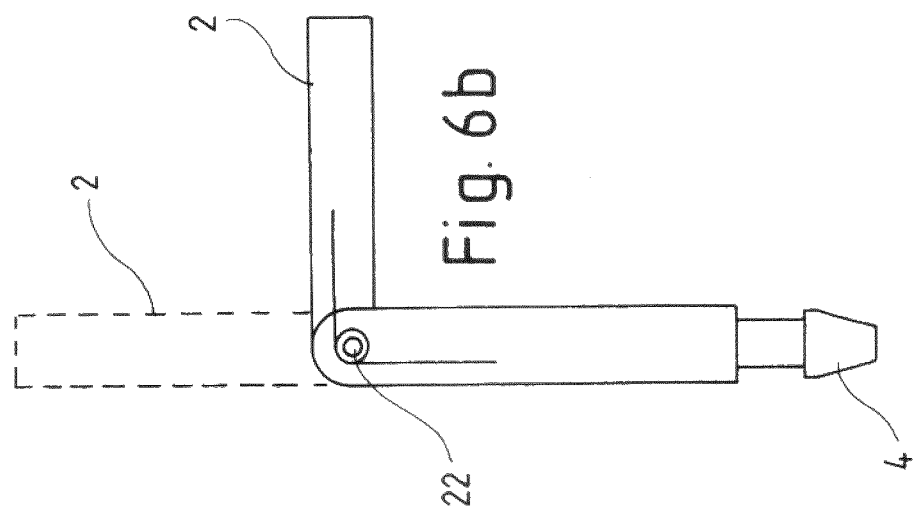
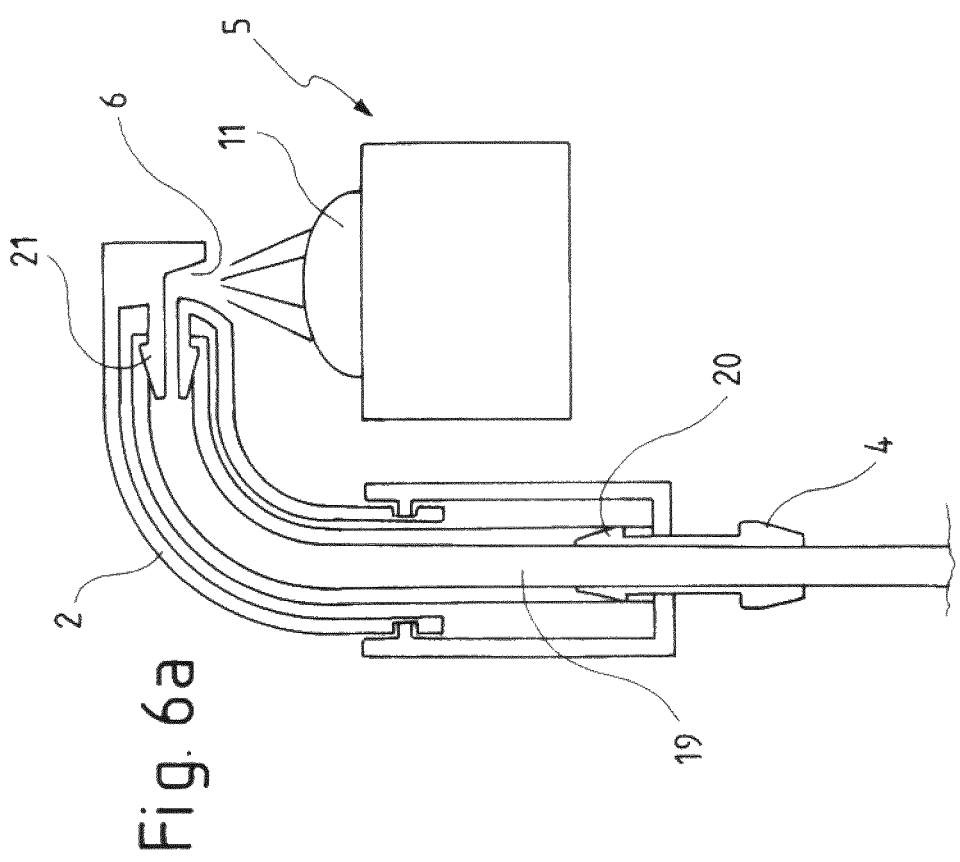

ON-BOARD VEHICLE VISION AND CLEANING SYSTEM

FIELD

The invention refers to an on-board vehicle vision and cleaning system comprising a sensor unit, a cleaning fluid source, a cleaning fluid circuit or at least a cleaning fluid conduit, a cleaning fluid pump, at least one cleaning fluid nozzle, the sensor unit being mounted in a vehicle body.

BACKGROUND

Modern vehicles, particularly automobiles, mostly so-called SUVs are provided with external view cameras to enhance the driver's vision and to improve safety. Moreover, these cars are often equipped with sensors which detect approaching and passing cars from behind which are not visible to the driver in the rear mirrors due to the blind angle, and are not covered by the rear view mirrors.

In the prior art, rear view cameras are often integrated into the rear bumper or into the tail gate or the boot lid of the vehicle nearby the license plate. Due to that position at the car body, camera lenses or protective lens covers or the sensors are exposed to the vehicle's surroundings and dirt and debris, mud, salt spray etc. accumulate on the lens or on a lens cover or on a sensor cover during operation of the vehicle. Particularly, if cameras and/or sensors are integrated in the rear bumper or in the tail gate of the vehicle, they are particularly exposed to dirt and mud spray.

Therefore, it is generally known to provide external washing systems for cleaning lenses and sensors.

Various cleaning concepts have been proposed in the art, either in order to prevent built-up of dirt and debris on the camera lens, or to achieve an enhanced cleaning result.

Normally, cleaning fluid nozzles and nozzle assemblies are mounted on a vehicle adjacent to a camera or to a sensor, and are positioned such that liquid from the nozzles may be directly sprayed onto the surface to be cleaned. As already mentioned in the very beginning, the surface to be cleaned might be a lens cover, a lens dome or a sensor surface.

Generally, an issue with such systems is that the external viewing angle of the sensor or of the vision device should be as wide as even possible. For example, modern wide angle rear view systems advantageously cover at least a part of the rear bumper such that a parking distance indication may be easily provided to the driver. The demand for such wide angle lens systems and for nozzles being placed very close to the lens or lens cover is to some extent conflicting as with rear view cameras it might happen that the nozzles are also covered by the viewing angle of the sensor unit. If a visible image is to be displayed on a screen within the passenger compartment, the nozzles might be optically distracting.

Yet another drawback of a non-concealed arrangement of nozzles very close to the sensor is that such arrangement is also aesthetically not very pleasing.

Generally, it is known in the art to provide head lamp cleaning systems and windscreen cleaning systems at motor vehicles in a concealed fashion for aesthetical reasons.

For example, EP 1 616 762 A2 discloses a headlamp cleaning device including a spray nozzle, which in a rest position is arranged concealed in a bumper of the motor vehicle, and which can be positioned by means of an actuator in a cleaning position. The spray nozzle is arranged on a mounting, which is secured pivotably to the bodywork of the vehicle and which in the rest position is pivoted into the bodywork and which can be pivoted out into the cleaning position by an actuator which is in the form of a hydraulic rotary drive.

Such arrangement requires relatively much mounting space. Such space is for example available within the hollow interior of a bumper, however, mounting space at a boot lid or at a tail gate of a car might be more restricted and therefore the design of such a headlamp cleaning device is not suitable for cleaning safety sensors or cameras at a vehicle.

SUMMARY

It is thus an object of the current invention to provide an on-board vehicle vision and cleaning system, where the cleaning fluid nozzles may be placed very close to the sensor unit without impairing the external view of the sensor, and which is designed simple and may be operated easily.

Moreover, it is an object of the current invention to provide such an on-board vehicle vision and cleaning system which is also aesthetically pleasing in terms that it does not impair the outer appearance of the vehicle.

These and other objects are achieved by the subject matter of the independent claim 1. Advantageous embodiments of the invention may be derived from the dependent claims.

In accordance with the present invention, an on-board vehicle vision and cleaning system is provided. The system comprising:
- a sensor unit mounted in a vehicle body,
- a cleaning fluid source,
- a cleaning fluid circuit or a cleaning fluid conduit,
- a cleaning fluid pump,
- a nozzle carrier,
- at least one cleaning fluid nozzle attached to the nozzle carrier, wherein the nozzle carrier is designed as a swivel arm which upon actuation may be flipped from a tilted back position which is a rest position into an elevated position, which is an operating position, wherein the swivel arm in its rest position at least partially conforms or at least partially surrounds the sensor unit.

Briefly summarized, the invention provides an on-board vision and cleaning system wherein the sensor unit is at least partially surrounded by a swivel arm or flipper arm, which forms a nozzle carrier and which in the rest position, is arranged approximately in one plane with a surface of the sensor unit to be cleaned. Thus, the swivel arm does not project from this mounting plane of the sensor unit in its rest position and thus does not interfere with the viewing angle of the sensor.

Only in an operating position, in which the swivel arm is elevated, the swivel arm might be arranged within or might interfere with the viewing field of the sensor unit, however, a cleaning cycle of the exposed surface of the sensor unit might only take a few seconds, so that ultimately the cleaning action does not affect the function of the sensor unit.

A sensor unit in the sense of the current invention may be for example an external view camera or just a sensor for detecting approaching and passing cars, or even for creating a lane departure warning signal.

A sensor unit in the sense of the current application may be for example a laser scanner, which might be required for autonomous driving.

A sensor unit in the sense of the present application may also be designed as an external view camera as well as a sensor at the same time to generate a lane departure warning to the driver or to detect objects approaching the vehicle which are normally not visible in the rear view mirrors.

A sensor unit according to the present invention may be an imaging device using solid state technologies, for instance CMOS or CCD pixel sensor technology in combination with for instance a video monitor display for automotive navigation systems, i.e. so-called sat nav units. The image sensor unit may comprise a camera lens system with at least one lens surface or cover surface.

A cleaning fluid nozzle within the sense of the present invention may be a fluidic oscillator, a pencil jet nozzle or the like. The fluid nozzle may have an adjustable eyeball nozzle body.

A fluid nozzle in the sense of the present application may also be an airblast nozzle, which may be also any type of nozzle through which an air jet, preferably a pencil jet may be ejected.

A cleaning fluid in the sense of the current application may be a liquid as well as gas or air.

A cleaning fluid pump according to the invention may be a conventional-type fluid pump, particularly an impeller pump with one or several impeller wheels. The fluid pump may have one or more fluid exit ports and at least one fluid entry port receiving a liquid cleaning fluid from the cleaning fluid source.

The on-board vision and cleaning system according to the current invention might benefit from a cleaning fluid source and a cleaning fluid circuit of an associated headlamp cleaning system or windshield cleaning system.

A cleaning fluid circuit in the sense of the current application may include a cleaning fluid conduit or cleaning fluid hoses as well as connectors and valves, i.e. check valves and/or pressure retaining valves.

A cleaning fluid circuit in the sense of the present application does not necessarily have to be a closed circuit. A person skilled in the art will appreciate that the term "cleaning fluid circuit" includes also a single fluid conduit from the cleaning fluid pump to a fluid nozzle. A cleaning fluid circuit must not necessarily be and normally is not a closed loop.

The sensor unit preferably is mounted in a panel of a vehicle body, the panel might be fitted into a boot lid or tail gate of a vehicle. A person skilled in the art will appreciate that the sensor unit might also be fitted into a bumper or into the casing of an exterior rear view mirror. A person skilled in the art will appreciate that the sensor unit might be mounted in any suitable planar surface of a vehicle body.

The sensor unit preferably includes a pane, lens cover or lens dome, which is the exposed surface to be cleaned in the sense of the current invention.

To be more specific, the swivel arm in its rest position at least partially conforms or at least partially surrounds the exposed surface of the sensor unit, which might have a circular or rectangular cross-section.

A person skilled in the art will appreciate that the cross-section of the exposed surface of the sensor unit is not crucial to the invention. In the event that the sensor unit is a laser scanning unit, for example the visible contour of the sensor unit might be rectangular.

Preferably, the swivel arm is partially or completely arranged outside the vehicle body or the bodywork of the vehicle.

Conforming the sensor unit means that the swivel arm is designed such that its contour almost or completely matches the outer contour of the exposed surface of the sensor unit. The exposed surface of the sensor unit and the swivel arm in the rest position do not project above reference pane which defines a limitation of the viewing angle of the sensor unit. So the sensor unit might even be an extreme wide angle lens which might have a viewing angle of 180° and the swivel arm would not interfere with the image of the sensor unit.

With the design of the swivel arm of the current invention the swivel arm does not need to be integrated into the bodywork of the vehicle, i.e. the swivel arm is not arranged in concealed fashion.

According to one advantageous embodiment of the on-board vehicle vision and cleaning system of the invention, it is provided that the swivel arm in its elevated position covers at least a part of the exposed surface of the sensor unit, i.e. interferes with the viewing field of the sensor unit, and in that position the nozzle is temporarily arranged in an elevated position above the exposed surface.

Since a cleaning cycle will only take seconds or fractions of seconds, it does not affect the operation of the sensor unit, if the swivel arm for instance is flipped through the viewing field of the sensor unit in order to perform a cleaning cycle.

According to the invention, there is no particular operating position of the swivel arm as the cleaning action may be performed during the whole movement of the swivel arm.

Alternatively, the vehicle vision and cleaning system according to the invention may be designed such that a cleaning action is only performed at a certain operating position of the swivel arm, for example if the swivel arm is in its maximum elevated position.

In one advantageous embodiment of the on-board vehicle vision and cleaning system according to the invention the swivel arm is moveable back and forth between a rest position and an operating position. The operating position again might be any position of the swivel arm other than the rest position.

Preferably, the swivel arm is moveable between first and second tilted back rest position, and preferably conforms also around the sensor unit in either rest position. For instance, the swivel arm might be flipped over from one rest position to the other rest position and thereby performing a cleaning action during this movement.

In one advantageous embodiment of the vehicle vision and cleaning system according to the invention, the swivel arm is hinged to a rotary drive. The rotary drive might be a hydraulic drive, operated by the fluid pressure of the cleaning fluid, i.e. the pressure of the cleaning fluid will be utilized to drive the swivel arm and to perform the cleaning action at the same time. Such a rotary drive is for instance disclosed in EP 1 616 762 the content of which as regards the rotary drive is fully incorporated herein by reference.

In one preferred embodiment of the on-board vehicle vision and cleaning system according to the current invention, the swivel arm is in the form of a ring segment conforming the sensor unit and which may be rotated over the sensor unit or which may be flipped over the sensor unit during a cleaning cycle. The ring segment may extend over an arc of circle of e.g. 90°. With such a design of the swivel arm advantageously at least one nozzle is arranged at the leading end of the swivel arm, and in the elevated position of the swivel arm the nozzle would be arranged approximately in the centre of the viewing field of the sensor unit. In that event, the sensor unit would include a circular- or dome-shaped circular pane, cover or viewing window defining the surface to be cleaned.

Alternatively, the swivel arm could be designed as a ring segment extending over an art of circle of about 180°. One nozzle at the crest of the arc or several nozzles along the length of the arc could be provided. The nozzles could be either fluidic nozzles or airblast nozzles as mentioned before.

In one other advantageous embodiment of the on-board vehicle vision and cleaning system according to the invention, the swivel arm could have a bowl-like or dome-like configuration, which creates a kind of swirling effect on the liquid, giving a more efficient cleaning action with less fluid consumption.

The swivel arm may encompass a cleaning fluid conduit or may define a cleaning fluid volume.

The swivel arm may encompass a so-called energizing hose which is bent and may be expanded by the pressure of the cleaning fluid. The expansion of the energizing hose may be utilized for producing a rotary movement of the swivel arm.

For that purpose, the energizing hose may be made from a resilient material with a shape memory or the energizing hose alternatively may include a spring element which imposes a 90°-bend on the hose. Once the fluid pressure enters the energizing hose, the pressure built up inside the hose causes the hose to expand, i.e. to stretch while the spring force of the spring is overcome so that the swivel arm may be rotated into its cleaning position.

Alternatively, the swivel arm could be articulated to a conduit and a spring element within the joint between the swivel arm and the conduit and may hold the swivel arm at 90° to the vertical. Once the fluid pressure enters the swivel arm the pressure built-up will cause an elevation of the swivel arm against the biasing force of the spring.

BRIEF DESCRIPTION OF THE DRAWINGS

The invention hereinafter will be explained by way of example with reference to the accompanying drawings in which:

FIG. 1 shows a first schematic side view of a part of the on-board vision and cleaning system according to the current invention with the swivel arm in its stationary position, i.e. in its rest position, shown in dotted lines, and with the swivel arm in its elevated operating position shown in solid lines;

FIG. 2 is a perspective view of another variant of a part of the on-board vision and cleaning system according to the invention, where the rest position of the swivel arm is shown in dotted lines;

FIG. 3 is yet another embodiment of the on-board vision and cleaning system as a perspective view according to the view of FIG. 2;

FIG. 4a is yet another embodiment of the on-board vision and cleaning system with another design of the swivel arm;

FIG. 4b is the system according to FIG. 4a with the swivel arm in its elevated/extended operating position;

FIG. 4c is a section through the swivel arm of the embodiment according to FIG. 4a in its rest position;

FIG. 4d is a section through the swivel arm of FIG. 4a in its elevated operating position;

FIG. 5a is a sectional side view of a part of the on-board vision and cleaning system according to the invention, which schematically shows one variant of a driving mechanism for the swivel arm;

FIG. 5b is a front view of the system according to FIG. 5a;

FIG. 6a is an alternative driving concept for the system of the current invention, partly in section; and FIG. 6b is a schematic view showing the mechanical principle of the driving concept according to FIG. 6a.

DETAILED DESCRIPTION

FIG. 1 shows a part of the on-board vision and cleaning system 1 according to the invention mounted to the bodywork of a vehicle in the form of a passenger car. Means for mounting the on-board vision and cleaning system 1 are not shown nor is the bodywork of the passenger car shown.

The on-board vision and cleaning system 1 comprises a swivel arm 2 articulated with a rotary drive 3. The rotary drive 3 is designed as a hydraulically operated rotary drive, i.e. the rotary drive 3 is driven by the fluid pressure of a cleaning fluid 7 provided from a cleaning fluid source by a cleaning fluid pump. Neither the cleaning fluid source nor the cleaning fluid pump are shown, these systems are rather conventional. As already mentioned, the rotary drive 3 may be connected to a cleaning fluid circuit in the passenger car, which is already being utilized for headlamp cleaning or windshield cleaning of the car. The rotary drive 3 for that purpose has a connector 4 for attaching a cleaning fluid hose.

The sensor unit denoted by reference numeral 5 in FIG. 1 is also only shown very roughly. The sensor unit 5 as shown in FIG. 1 is for instance a laser scanning unit as required for autonomous driving of the passenger car and may have a rectangular exposed surface mounted in a panel attached to the bodywork of the car. The panel is not shown in the embodiment according to FIG. 1. In FIG. 1, two positions of the swivel arm 2 are shown; a rest position of the swivel arm as indicated by the dotted lines and an elevated operating position of the swivel arm is indicated by the solid lines.

Attached to the swivel arm 2 are two nozzles 6 from which a cleaning fluid 7 may be ejected. The swivel arm 2 according to the embodiment of FIG. 1 has a kind of bend or rectangular shape and may be rotated around a pivot axis 8 of the rotary drive 3.

The swivel arm 2 may be rotated back and forth between the two positions shown in FIG. 1, or alternatively the swivel arm 2 may be completely flipped over the sensor unit 5 from a first rest position shown in the dotted lines in FIG. 1 to a second rest position in the opposite side of the sensor unit 5 not shown. During the rotating movement of the swivel arm 2 a cleaning cycle may be performed, i.e. the cleaning fluid 7 is ejected from the cleaning nozzles 6.

The rotatory movement caused by the rotary drive 3 is caused by the fluid pressure of the cleaning fluid 7 delivered to the rotary drive 3 via connector 4. The fluid pressure, normally in the order of more than 2 bar, will be sufficient for rotating the swivel arm 2 and at the same time for providing a cleaning action.

As this can be seen from FIG. 1, the swivel arm 2 in its rest position, i.e. in its stationary position, is arranged side by side with the sensor unit 5, i.e. with the exposed surface of the sensor unit 5. In that position, the swivel arm 2 may tightly conform to the sensor unit 5, as this is shown for example in FIGS. 2 and 3 with reference to another embodiment.

The exposed surface of the sensor unit 5 may be slightly elevated with regard to the swivel arm 2 in its tilted back position, however, the swivel arm 2 in its tilted back position can be also arranged in one plane with the exposed surface of the sensor unit 5, which in terms of aesthetics is rather pleasing.

If the swivel arm 2 relatively tightly conforms to the sensor unit 5, this has also the advantage that no dirt can built up in a gap between the swivel arm 2 and the sensor unit 5.

The sensor unit 5 may define a reference plane, which is the lowermost plane restricting the viewing angle of the sensor unit 5 backwards. The sensor unit 5 for example might have a viewing angle of 180°, so that in the embodiment shown in FIG. 1, in the stationary position or in the rest position of the swivel arm 2, the swivel arm would not interfere with the viewing field of the sensor unit 5.

While FIG. 1 shows a swivel arm 2 with two nozzles attached to the swivel arm 2, and with a sensor unit 5 which has a rectangular exposed surface, FIGS. 2 and 3 show two other embodiments of the on-board vision and cleaning system 1 according to the invention where the swivel arm 2 has a circular arc-like shape.

Generally, in the figures same or similar parts have been denoted by the same reference numerals.

Now referring to FIG. 2, the embodiment according to FIG. 2 also shows the swivel arm 2 in its rest position in dotted lines, and in one operating position in solid lines. The rotatory movement of the swivel arm 2 is indicated by the arrows 9, the fluid entry direction is indicated by the arrows 10.

In the embodiment according to FIG. 2, the sensor unit 5 includes a spherical lens dome 11 mounted in a panel 12. The panel 12 in turn is mounted in the bodywork of the vehicle. The swivel arm 2 again partly conforms to the sensor unit 5. To be more specific, the swivel arm 2 conforms to the panel 12 holding the lens dome 11. The swivel arm 2 has an arc-like shape and extends over a quarter circle (90°), so that the leading end of the swivel arm 2 in its elevated position is positioned above the sensor of the lens dome 11. At this point, the nozzle 6 is attached to the swivel arm 2. From the elevated position of the swivel arm 2 shown in FIG. 2 in solid lines, the nozzle 6 is in the viewing field of the lens dome 11, such that an even distribution of the cleaning fluid 7 over the lens dome 11 may be achieved.

Again, the swivel arm may flip between the two positions shown in FIG. 2, alternatively the swivel arm 2 may completely flip over the sensor unit 5. The embodiment of FIG. 3 is only different from the embodiment of FIG. 2 insofar as the swivel arm 2 has the shape of a semi-circle or a 180° arc, and the nozzle is mounted at the crest of said arc.

Turning now to FIGS. 4a to 4d, there is shown another embodiment of the on-board vision and cleaning system 1 according to the invention, where the swivel arm 2 has a bowl shape, which partly encloses the sensor unit 5 in its elevated position, so that a swirling effect of the cleaning fluid may be achieved, which will be rebound from the surface of the swivel arm 2 partially enclosing the sensor unit 5 in the operating position.

The design of the on-board vision and cleaning system 1 according to FIGS. 4a to 4d corresponds to the design of the system according to FIGS. 2 and 3.

FIGS. 5a and 5b show the principle of providing a rotatory motion to the swivel arm 2. In FIG. 5a, the swivel arm 2 is shown in the elevated position in dotted lines whereas it is shown in the rest position in solid lines.

The rotary drive 3 includes an inlet 13 for the cleaning fluid 7, which upon entry into the rotary drive 3 acts on a piston 14. The piston 14 is arranged within a housing 15 of the rotary drive 3 and is biased into the position as shown in FIG. 5a by a piston spring 16. The piston 14 is sealed with respect to the housing 15 by a piston seal 17. The piston seal 17 could be any type of appropriate seal.

If the cleaning fluid 7 enters the inlet 13, this forces the piston 14 against the biasing force of the piston spring 16 to extend once the spring force is overcome. The piston 14 is attached to a moveable bar 18 which in turn is attached to the swivel arm 2 either directly or by an additional gear. As the piston 14 extends the bar 18 moves forward inside the housing 15 while at the same time the swivel arm 2 is rotated into the operating position and sprays the sensor unit removing any dirt from the exposed surface of the sensor unit 5.

As the piston 14 extends, i.e. moves to the left hand side shown in FIG. 5a, the cleaning liquid 7 may enter a cleaning fluid channel either integrated into the swivel arm 2 or encompassed by or attached to the swivel arm 2.

An alternative driving concept is illustrated by FIGS. 6a and 6b. As this is shown in FIG. 6a, the rotary drive 3 includes a housing 15 within which an energizing hose 19 is arranged. The energizing hose 19 extends between a first fitting 20 of the inlet 13 and between a second fitting 21 at the leading end of the swivel arm 2.

The energizing hose 19 can either be formed from a resilient material with a shape memory, or includes a spring element 22 or be designed as coil spring. Due to the shape memory properties of the energizing hose 19 or due to the spring element 22 the energizing hose 19 which extends through the joint of the swivel arm 2 to the rotary drive 3 is held at a 90° bend to the vertical. Once fluid pressure enters the rotary drive 3, the pressure built up inside the energizing hose 19 allows it to overcome the spring force or the resilient force of the energizing hose 19 and flips/rotates the swivel arm 2 into its operating position.

REFERENCE NUMERALS

1 on-board vision and cleaning system
2 swivel arm
3 rotary drive
4 connector
5 sensor unit
6 nozzles
7 cleaning fluid
8 pivot axis
9 arrows
10 arrows
11 lens dome
12 panel
13 inlet
14 piston
15 housing
16 piston spring
17 piston seal
18 moveable bar
19 energizing hose
20 first fitting
21 second fitting
22 spring element

What is claimed is:

1. A motor vehicle on-board vision and cleaning system comprising:
   a sensor unit mounted in a vehicle body;
   a cleaning fluid source;
   a cleaning fluid circuit or a cleaning fluid conduit;
   at least a cleaning fluid pump;
   a nozzle carrier;
   at least one cleaning fluid nozzle attached to the nozzle carrier, wherein the nozzle carrier comprises a swivel arm configured to pivot upon actuation from a tilted back position which is a rest position, into an elevated position which is an operating position, wherein the swivel arm in the rest position at least partially conforms to the sensor unit, wherein the swivel arm at least partially conforms to the sensor unit such that a contour of the swivel arm matches an outer contour of an exposed surface of the sensor unit, wherein the swivel arm pivots on a stationary pivot axis, and wherein the stationary pivot axis is positioned such that the swivel arm, when in the elevated position, extends over the sensor unit from opposing sides of the sensor unit.

2. The motor vehicle on-board vision and cleaning system according to claim 1, wherein the swivel arm in the elevated position is arranged in front of an exposed surface of the sensor unit and interferes with a viewing field of the sensor unit, and, in the elevated position, the nozzle is temporarily arranged in an elevated position above the exposed surface.

3. The motor vehicle on-board vision and cleaning system according to claim 1, wherein the swivel arm is moveable back and forth between the rest position and the operating position.

4. The motor vehicle on-board vision and cleaning system according to claim 1, wherein the swivel arm is moveable between first and second tilted back rest positions.

5. The motor vehicle on-board vision and cleaning system according to claim 4 wherein the swivel arm at least partially conforms to the sensor unit in either of the first and the second tilted back rest positions.

6. The motor vehicle on-board vision and cleaning system according claim 1, wherein the swivel arm is moveable during performance of a cleaning cycle.

7. The motor vehicle on-board vision and cleaning system according to claim 6, wherein the rotary drive is a hydraulic drive operated by fluid pressure of a cleaning fluid.

8. The motor vehicle on-board vision and cleaning system according claim 1, wherein the swivel arm is hinged to a rotary drive.

9. The motor vehicle on-board vision and cleaning system according to claim 1, wherein the swivel arm is in a form of a ring segment or in a form of a bend segment conforming to the sensor unit and which may be rotated over the sensor unit or which may be flipped over the sensor unit during a cleaning cycle.

10. The motor vehicle on-board vision and cleaning system according to claim 1, wherein the swivel arm has a bowl-like or a dome-like configuration.

11. The motor vehicle on-board vision and cleaning system according to claim 1, wherein the swivel arm encompasses the cleaning fluid conduit or defines a cleaning fluid volume communicating with the nozzle.

12. The motor vehicle on-board vision and cleaning system according to claim 1, wherein the swivel arm comprises at least one of a cleaning liquid nozzle and an airblast nozzle.

13. The motor vehicle on-board vision and cleaning system according to claim 1 wherein in the rest position the swivel arm does not interfere with a viewing angle of the sensor unit.

14. The motor vehicle on-board vision and cleaning system according to claim 1 wherein the sensor unit includes a panel which surrounds a lens dome, and the swivel arm pivots about an axis through the panel which is remote from the lens dome such that the pivot axis does not extend through the dome.

* * * * *